(No Model.) 2 Sheets—Sheet 1.
A. H. HALL.
WAGON BED.
No. 388,557. Patented Aug. 28, 1888.
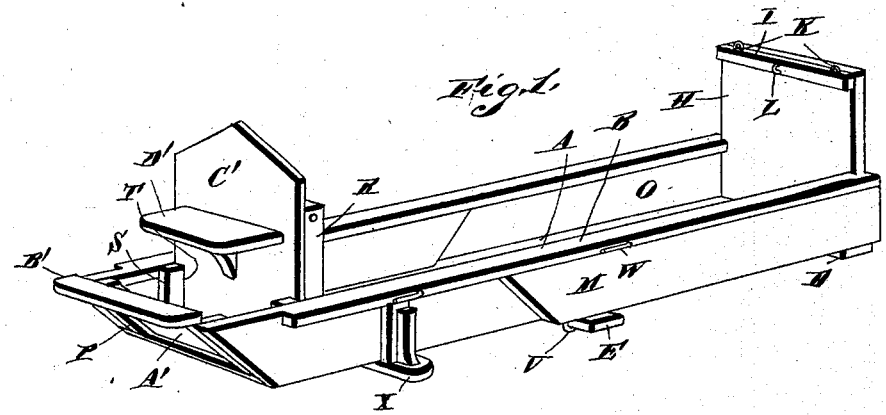
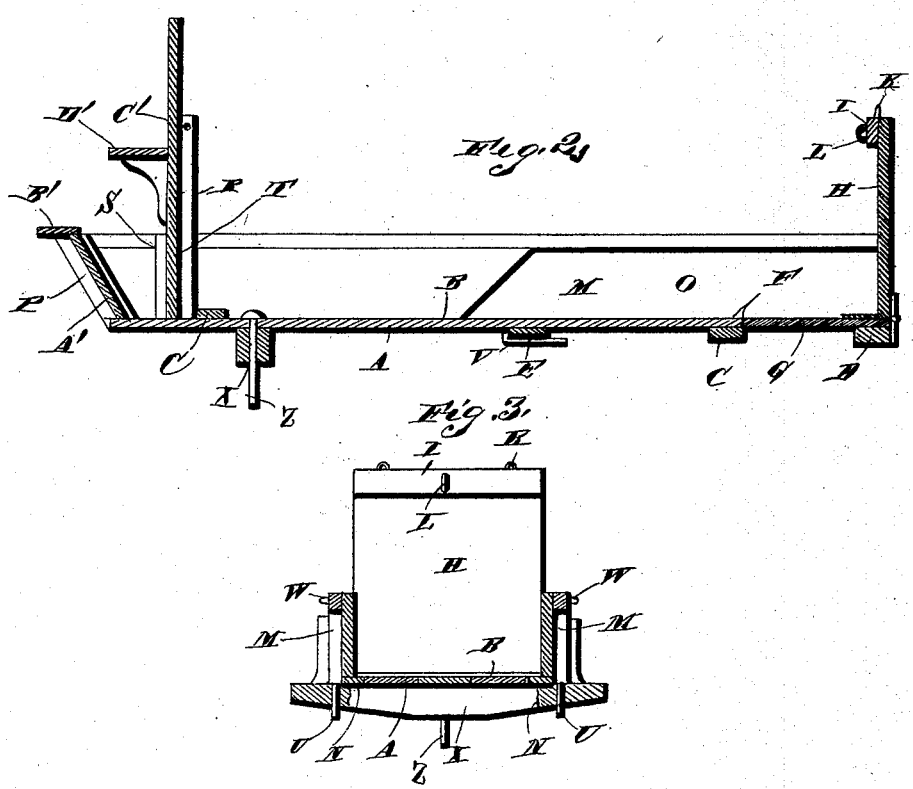
Witnesses.
O. L. Taylor,
J. W. Garner
Inventor.
A. H. Hall,
By his Attorneys
C. A. Snow & Co.

(No Model.) 2 Sheets—Sheet 2.
A. H. HALL.
WAGON BED.
No. 388,557. Patented Aug. 28, 1888.
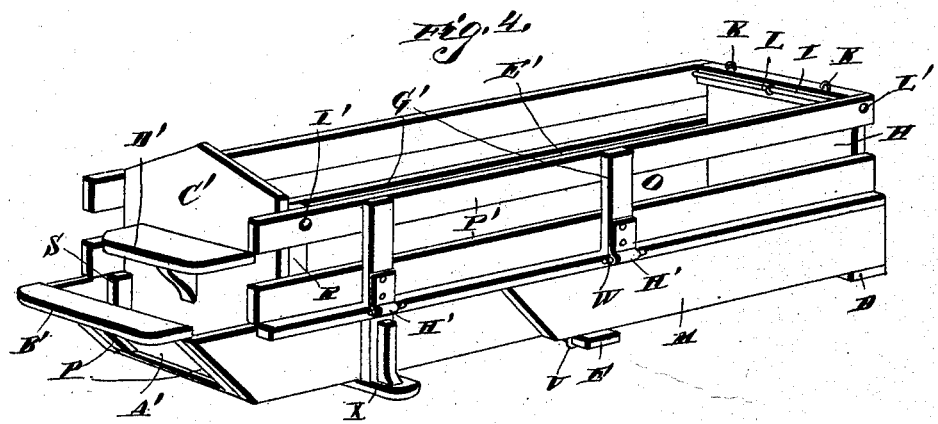
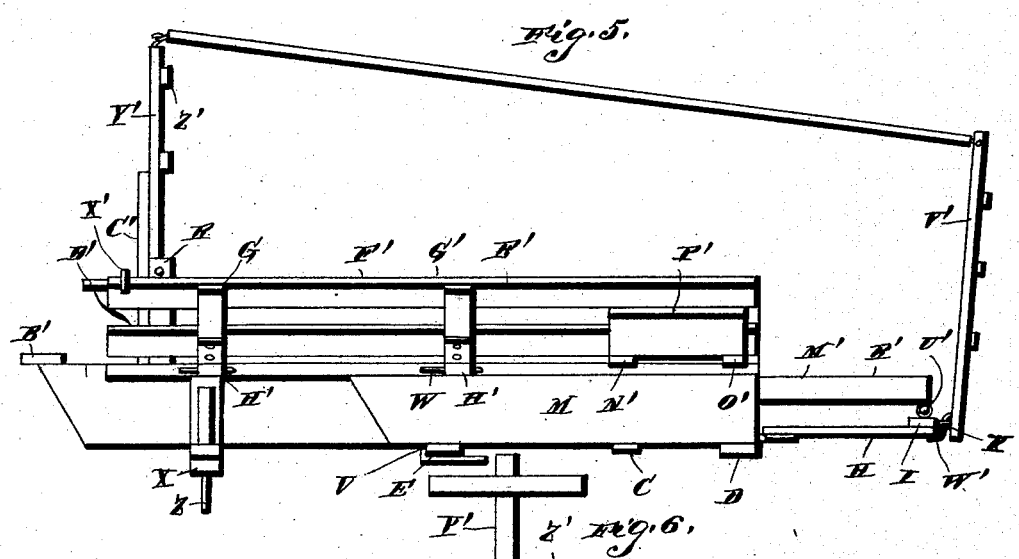
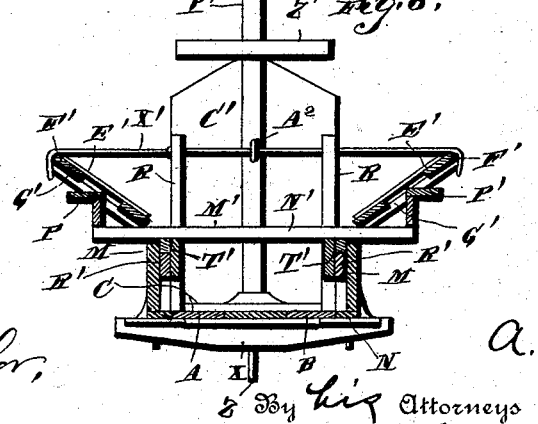
Witnesses.
C. B. Taylor,
J. W. Garner
Inventor.
A. H. Hall.
By his Attorneys

UNITED STATES PATENT OFFICE.

AUGUSTUS H. HALL, OF RAYMOND, DAKOTA TERRITORY.

WAGON-BED.

SPECIFICATION forming part of Letters Patent No. 388,557, dated August 28, 1888.

Application filed May 31, 1888. Serial No. 275,612. (No model.)

*To all whom it may concern:*

Be it known that I, AUGUSTUS H. HALL, a citizen of the United States, residing at Raymond, in the county of Clark, Dakota Territory, have invented a new and useful Improvement in Wagon-Beds, of which the following is a specification.

My invention relates to an improvement in convertible wagon-beds; and it consists in the peculiar construction and combination of devices, that will be more fully set forth hereinafter, and particularly pointed out in the claims.

The object of my invention is to provide a wagon-bed which is adapted to be used for hauling grain or hay and other farm products at will, and which is constructed of separable parts which are each so light that they can be readily handled by one person with comparative ease, and thus enable the bed to be arranged for hauling any desired material with very little difficulty.

In the accompanying drawings, Figure 1 is a perspective view of my invention when the same is arranged to form a box or closed bed. Fig. 2 is a vertical longitudinal central sectional view of the same. Fig. 3 is a vertical transverse sectional view taken on the line $xx$ of Fig. 1. Fig. 4 is a perspective view of my invention, showing the wings attached thereto to adapt the bed for transporting live stock. Fig. 5 is a side elevation, partly in section, of my invention when arranged to form a rack for transporting hay or straw. Fig. 6 is a transverse sectional view taken on the line $yy$ of Fig. 5.

A represents the bottom of the bed, which comprises a number of boards, B, of suitable length and width, connected near their ends, on their upper and lower sides, by transverse cleats or battens C. Under the bottom A, at the rear end thereof, is a cross-bar, D, and under the center of the bottom is a cross-bar, E, of somewhat greater length. At the rear end of the bottom of the bed, at the center thereof, is an opening, F, provided with a slide, G, which is guided in suitable ways and is adapted to be drawn outward, so as to uncover the opening for the grain to run out.

To the rear end of the bottom A is hinged the end-gate H, which has a transverse cleat, I, on its inner side, at its outer edge, is provided with a pair of eyebolts, K, near its outer corner, and has an eyebolt, L, in the center of the cleat.

M represents the sides of the bed or box, which are provided at their lower edges with inwardly-extending flanges N, and have longitudinal recesses O on their inner sides, at their rear ends, and of suitable length. The front portions of the said sides M are also recessed on their outer sides, as shown. The front ends of the sides M are inclined, and are provided on their opposing sides with inclined guideways P.

R represents a pair of vertical standards, which are arranged on the inner sides of the boards M, near the front ends thereof, and near the said standards, on their front sides, are vertical cleats S, guideways T being formed between the said standards and the said cleats.

From the under sides of the boards M, at a suitable distance from the front ends thereof, depend pins U, and V represents a pair of keepers which depend from said boards at the centers thereof and have their rear sides open. On the outer sides of the boards, at their upper edges, at suitable distances apart, are forwardly-extending pintle-arms W, for the purpose to be hereinafter described. The edges of the bottom A fit between the flanges at the lower edges of the boards M, the ends of the cross-bar E engage the keepers V, and the ends of the cross-bar D engage the lower sides of the boards at the rear ends thereof.

X represents the front bolster, which is of the usual construction, and is provided near its ends with the standards Y, that bear against the outer side of the boards M, and said bolster has vertical openings near its ends to receive the depending pins U, whereby the sides M are securely fastened on the bolster. A bolt or pin, Z, passes through the bottom of the bed and through a central opening in the front bolster.

A' represents the front side of the wagon-bed, which is fitted in the inclined ways P and at the upper edge of the said front side or board, A', is a horizontal foot-board, B'.

C' represents a vertical board which is fitted in the grooves T between the standards R and cleats S, and is adapted to be removed therefrom. Said board is of suitable height to extend above the standards R, and on the front side of said board, at a suitable distance from its upper end, is a seat, D'. The said board forms the back for the said seat, as will be readily understood, and also serves to press the boards M outward firmly against the standard of the bolster. The end-gate H is adapted to be folded or turned vertically between the rear sides of the boards M, as illustrated in Fig. 1. When thus arranged, the body forms a box or bed adapted for hauling grain in bulk and other like commodities. By opening the slide G the grain may be discharged from the body or box.

E' represents a pair of side wings, which are composed of parallel bars F', connected by a pair of vertical bars, G'. The said bars have at their lower ends hinges or traps H', which are adapted to engage the pintle-arm W, so as to hinge the wings to the sides M and permit said wings to be inclined outward from the sides M, or to be turned up to a vertical position in alignment therewith and caused to bear against the vertical standards R. When said wings are in this vertical position, as illustrated in Fig. 4, they are secured to the standards R by means of a screw-bolt, I', and the rear upper corners of said wings are secured against the edges of the end-gate by means of a screw-bolt, L', which passes through openings in the wings and through the eyebolt L.

M' represents a sliding frame, the construction of which is as follows:

N' O' represent a pair of parallel transverse bars, the rear one of which is longer than the forward bar, and said bars are connected at the ends of the bar N' by means of boxes or fenders P', which are adapted to be arranged over the rear wheels (not shown) of the vehicle.

R' represents a pair of longitudinal bars, which have their front ends secured to boards S', that depend from the bars N' O', grooves T' being formed on the outer sides of the boards F' above the bars R', which are adapted to engage the inwardly-extending flanges at the upper sides of the recesses O, and thereby guide the frame longitudinally between the sides M. At the rear lower corners of the bars R' are eyebolts or keepers U'.

V' represents an end ladder or rack-frame, which comprises a pair of inclined bars converging toward their upper ends and connected by a series of transverse bars, as shown. At the lower corners of the said rack-frame or ladder are hooks or arms W', which are adapted to engage the eyebolts K at the outer end of the end-gate, so as to secure the frame or ladder thereto. When thus arranged, the sliding frame M' is moved rearward, so as to extend the arms or bars R' beyond the rear end of the bed and cause the eyes or keepers U' to align with the eye L. One of the bolt-rods is then passed through the said keepers to secure the end-gate in a horizontal position and cause the same to form a rearward extension of the bed. The frame or rack V' is attached to the rear side of the end-gate, as before stated, and the side wings are secured to the sides M in an inclined position, with their upper bars bearing at their rear ends on the extending ends of the bar O', the front ends of the wings being supported by a cross-bar, X', as shown in Fig. 5.

Y' represents a vertical standard which has a transverse foot or bar at its lower end adapted to bear against the bottom of the bed on the rear side of the board C', and Z' represents a series of cross-bars, which are secured to the standard Y' at the upper end thereof. An eyebolt, $A^2$, is on the rear side of the standard and is caused to align with the openings near the upper ends of the standards R, and one of the bolt-rods hereinbefore described is passed through the said opening and said eyebolt, so as to lock the standard firmly in position against the rear side of the board C'. The said standard and its cross-bars form the front rack or frame for the body of the wagon, as shown in Fig. 5, and when thus arranged the body is adapted for hauling hay, straw, and fodder.

Having thus described my invention, I claim—

1. In a wagon-bed, the combination of the bottom A, the sides M, detachable therefrom and having the guideways at their front ends on their inner sides, the front board, A', inserted in the said guideways, the cross-bar D on the under side of the bottom, at the rear end thereof, having its ends bearing against the under edges of the sides M, the cross-bar E under the center of the bottom, having its ends engaged by keepers V, that depend from the sides, and the bolster having the standards bearing against the outer sides of the body, substantially as described.

2. The combination, with the wagon-body having the vertical guideways in opposite sides at its front end, of the board C', detachably fitted in said guideways and having the seat on its front side, substantially as described.

3. The combination of the wagon-body, the end-gate hinged to the rear end thereof, the sliding frame in the body, and the devices, substantially as set forth, to secure said sliding frame to the end-gate when the latter is extended horizontally, substantially as described.

4. The combination, with the body or box, of the end-gate hinged thereto, the sliding frame having the rearward-extending arms adapted to be connected to the end-gate to secure the latter in a horizontal position, said frame being further provided with the transversely-extending bar O', and the wings detachably secured to the sides of the bed or body and supported by the bar O', substantially as described.

5. The combination of the bed or body, the end-gate hinged thereto and adapted to be extended to a horizontal position from the rear end of the body, and the rack-frame having the arms or hooks at its lower end adapted to engage keepers at the outer end of the end-gate, substantially as described.

6. The combination of the bed or body, the end-gate hinged to the rear end thereof, the frame or devices to secure said end-gate in a horizontal position, the wings detachably connected to the sides of the bed or body, the vertical boards C' near the front end of the bed or body, the standard adapted to be secured to said board, having its cross-bars at its upper end, and the rack-frame adapted to be secured to the rear end of the end-gate, substantially as described.

In testimony that I claim the foregoing as my own I have hereto affixed my signature in presence of two witnesses.

AUGUSTUS H. HALL.

Witnesses:
 J. P. GILLIES,
 F. S. DUNLAP.